United States Patent [19]
Karasaki et al.

[11] Patent Number: 4,857,718
[45] Date of Patent: Aug. 15, 1989

[54] FOCUS DETECTING DEVICE

[75] Inventors: Toshihiko Karasaki; Kazumi Sugitani, Osaka, both of Japan

[73] Assignee: Minolta Camera Kabushiki Kaisha, Osaka, Japan

[21] Appl. No.: 193,816

[22] Filed: May 12, 1988

[30] Foreign Application Priority Data

May 15, 1987 [JP] Japan .................. 62-119362
May 21, 1987 [JP] Japan .................. 62-126825

[51] Int. Cl.⁴ ............................... G01J 1/20
[52] U.S. Cl. ..................... 250/201; 250/204
[58] Field of Search ............ 250/201 PI, 204, 208, 250/209, 237 R; 354/406, 407, 408

[56] References Cited

U.S. PATENT DOCUMENTS

| | | | |
|---|---|---|---|
| 4,083,056 | 8/1976 | Nakamura et al. | 354/407 |
| 4,293,205 | 10/1981 | Tokutomi et al. | 354/23 |
| 4,341,953 | 7/1982 | Sakai et al. | 250/201 |
| 4,415,246 | 11/1983 | Karasaki et al. | 354/25 |
| 4,431,285 | 2/1984 | Kajita et al. | 354/405 |
| 4,555,169 | 11/1985 | Suda et al. | 354/407 |
| 4,636,624 | 1/1987 | Ishida et al. | 250/201 |
| 4,659,917 | 4/1987 | Suzuki et al. | 354/407 |
| 4,660,955 | 4/1987 | Ishida et al. | 354/408 |
| 4,712,901 | 12/1987 | Ohtaka | 354/407 |
| 4,721,975 | 1/1988 | Hamada | 354/308 |
| 4,766,302 | 8/1988 | Ishida et al. | 250/201 |
| 4,808,808 | 2/1989 | Karasaki et al. | 354/408 |

FOREIGN PATENT DOCUMENTS

| | | |
|---|---|---|
| 58-42443 | 9/1983 | Japan . |
| 58-49844 | 11/1983 | Japan . |
| 59-129810 | 7/1984 | Japan . |
| 59-121613 | 8/1984 | Japan . |
| 60-60612 | 4/1985 | Japan . |
| 60-60615 | 4/1985 | Japan . |
| 62-95511 | 5/1987 | Japan . |
| 62-138808 | 6/1987 | Japan . |

*Primary Examiner*—David C. Nelms
*Attorney, Agent, or Firm*—Burns, Doane, Swecker & Mathis

[57] ABSTRACT

A focus detecting device has a plurality of focus detection blocks, which blocks reproduce images of an object once produced by an objective lens as a pair of images on first and second CCD line sensors arrayed in a line, by means of a condenser lens, a pair of re-imaging lenses, and an aperture mask having a pair of aperture openings provided in the proximity of the re-imaging lenses, which blocks detect the positions of the paired images formed on the CCD line sensors, and detects the focus condition of the objective lens. In the focus detecting device, a light shield member to prevent the incidence of harmful light on the CCD line sensors is provided between at least the condenser lens and the CCD line sensors.

17 Claims, 9 Drawing Sheets

FOCUS DETECTING DEVICE

BACKGROUND OF THE INVENTION

1. Field of the Invention

The present invention relates to a multi-area focus detecting device in which the focus condition of the objective lens is detected not only with respect to an axial focus detection area located on the optical axis of the objective lens, but also with respect to at least one off-axial focus detection area located far from the optical axis thereof.

2. Description of the Prior Art

A conventional multi-area focus detecting device is shown in FIG. 12. In this device, a pair of light fluxes used for detecting the focus condition with respect to the axial focus detection area, containing a pair of principal rays l1 and l2, are focused on a CCD (charge-coupled device) line sensor P0, through an aperture opening E0 provided on a field mask FM, a condensor lens L0, a pair of aperture openings A1 and A2 provided on an aperture mask AM, and a pair of re-imaging lenses L1 and L2 formed on a re-imaging lens plate L, and a pair of secondary images are formed on the CCD line sensor P0. On the other hand, two pairs of light fluxes used for detecting the focus condition with respect to two off-axial focus detection areas, containing two pairs of principal rays l3 and l4, l5 and l6 respectively, are focused on CCD line sensors P01 and P02 respectively, through a pair of aperture openings E01 and E02, condenser lenses L01 and L02, two pairs of aperture openings A3 and A4, A5 and A6, and two pairs of re-imaging lenses L3 and L4, L5 and L6, respectively, and respective pairs of secondary images are formed on CCD line sensors P01 and P02, respectively. The focus condition of the objective lens TL can be detected by means of detecting three pairs of the secondary images.

An AF (auto-focus) sensor module AF is composed of the aforementioned field mask FM, condenser lenses L0, L01, and L02, aperture mask AM, re-imaging lens plate L and CCD line sensors P0, P01, and P02.

However, respective light fluxes used for detecting the focus condition become close to each other in order to make the AF sensor module AF more compact. Therefore, any light rays, which includes light rays to be incident on the other CCD line sensors, may be incident on the CCD line sensors, resulting in the deterioration of the precise focus detection capability.

SUMMARY OF THE INVENTION

Therefore, the object of the present invention is the provision of a focus detecting device such that is able to prevent the incidence of harmful light on the CCD line sensors, that can achieve a more compact AF module, and that can obtain high focus detection precision.

To achieve the aforementioned object, a focus detecting device according to an embodiment of the present invention is characterized in that it comprises an objective lens for forming an image of an object;

a plurality of focus detecting blocks each of which includes; a condenser lens located nearby a predetermined focal plane of the objective lens; a pair of image re-forming lenses, located behind the condenser lens, for re-forming a pair of secondary images of the image formed by the objective lens; a mask plate, located nearby the pair of image re-forming lenses, having a pair of aperture openings through which a light bundle forming the secondary images passes; a light receiving means for receiving the pair of the secondary images formed by the pair of image re-forming lenses to produce a light intensity distribution signal representing the light intensity distribution of the secondary images; and a light interrupting means, located between the condenser lens and the light receiving means, for prohibiting the harmful light from being incident on the light receiving means; and a focus condition calculating means for calculating a focus condition of the objective lens in accordance with the light intensity distribution signals produced by the plurality of focus detecting blocks.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
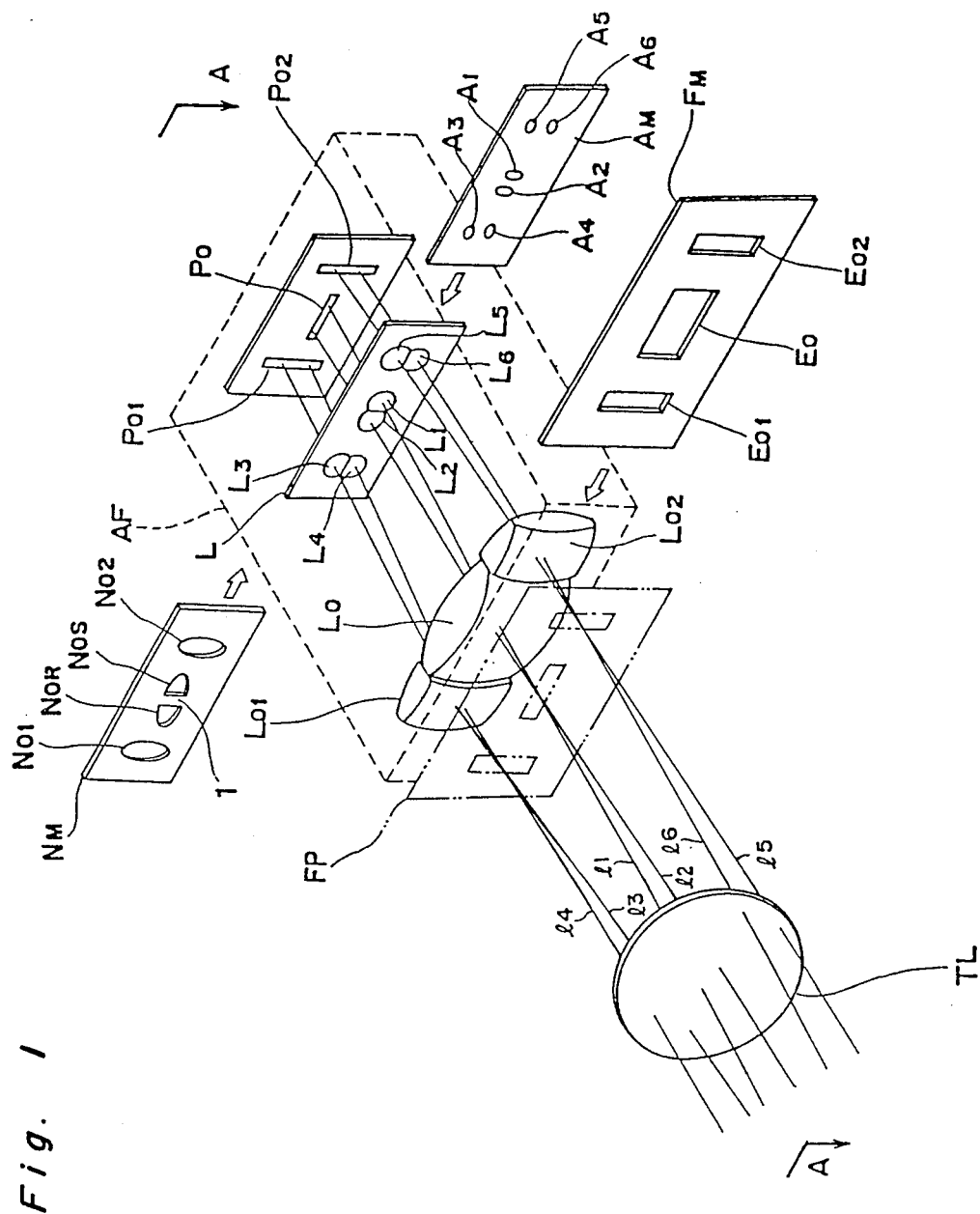
FIG. 1 is a perspective view showing the general construction of a first embodiment of the present invention.

Referring now to FIG. 1, which shows the general construction of a focus detecting device according to a first embodiment of the present invention, TL is an objective lens, and field mask FM is positioned in proximity to the predetermined focal plane FP. At the center part of said field mask FM is provided horizontally oriented rectangular aperture opening E0, on both sides of which are provided vertically oriented rectangular aperture openings E01 and E02. Light rays passing each rectangular aperture opening E0, E01 and E02 on said field mask FM pass respective condenser lenses L0, L01 and L02, and are converged.

Re-imaging lens plate L is provided with paired re-imaging lenses L1 and L2 arrayed at the center in a horizontal orientation, with paired re-imaging lenses L3-L4 and L5-L6 arrayed on either side in a vertical orientation. The aforementioned re-imaging lenses L1 to L6 are all plano-convex lenses with the same radius of curvature. Aperture openings A1 to A6 are provided on aperture mask AM at positions corresponding to re-imaging lenses L1 to L6. This aperture mask AM is positioned immediately before said re-imaging lens plate L, and is in contact with a flat surface of re-imaging lens plate L.

CCD line sensor P0 is positioned at the center of the substrate with a long horizontal orientation; CCD line sensors P01 and P02 are positioned on both sides of said substrate with a vertical orientation so that the orientation of the re-imaging lenses on the aforementioned re-imaging lens plate L are the same as the orientation of the aforementioned CCD line sensors. Said CCD line sensors P0, P01 and P02 each have first and second light receiving element arrays so that photoelectric conversion of the two images formed by the aforementioned re-imaging lens pairs can be separately accomplished.

Shield member NM is provided between the re-imaging lens plate L and CCD line sensors P0, P01 and P02 and immediately after re-imaging lens plate L. On this shield member NM are provided apertures N0S and N0R at the center, on both sides of which are provided apertures N01 and N02 with a vertical orientation. Block AF described by a dotted line in the figure represents the AF sensor module.

The focus detecting optical system of the above described construction works to detect the focus position in the following manner. The light flux for the off-axial focus detection area, that is, the off-axial light flux, containing the principal rays l3 and l4 travelling towards the field mask FM so as to pass away from the optical axis of the objective lens at a predetermined angle relative to the optical axis, passes through the respective rectangular opening E01 in the field mask FM and then through the respective condenser lens L01. The off-axial light flux having passed through the condenser lens L01 is deflected by the condenser lens L01 so as to travel towards the optical axis and then projected onto the associated CCD line sensor P01 through the paired apertures A3 and A4 in the aperture mask AM, the paired image re-forming lens L3 and L4 in the image re-forming lens plate L, and the aperture N01 in the shield member NM. In this way, paired images are re-formed on the CCD line sensors P01. On the other hand, the other light flux for the other off-axial focus detection area, that is, the other off-axial light flux, containing the principal ray l5 and l6 travelling towards the field mask FM so as to pass away from the optical axis at the predetermined angle relative to the optical axis, passes through the respective rectangular opening E02 in the field mask FM and then through the respective condenser lens L02 and are subsequently similarly projected onto the associated CCD line sensor P02 through the paired apertures A5 and A6 in the aperture mask AM, the paired image re-forming lens L5 and L6 in the image re-forming lens plate L, and the aperture N02 in the shield member NM. In this way, paired images are re-formed on the CCD line sensors P02.

The light flux for the axial focus detection area, that is, the axial light flux, containing principal rays l1 and l2 is, after having passed through the rectangular opening E0, the condenser lens L0, the paired apertures A1 and A2, the paired image re-forming lenses L1 and L2, and apertures N0S and N0R in the shield member NM, all aligned with the optical axis, converged on and projected onto the CCD line sensor P0, thereby to form the paired image thereon. By determining the positions of the paired images projected on the CCD line sensors P0, P01 and P02, the focusing condition of the objective lens TL can be detected. At such time, harmful light which may be incident on CCD line sensors P0, P01 and P02 through some passage other than the passages shown for principal rays l1, l2, l3, l4, l5, and l6 in FIG. 1 is blocked by the aforementioned shield member NM.

Figure 2:
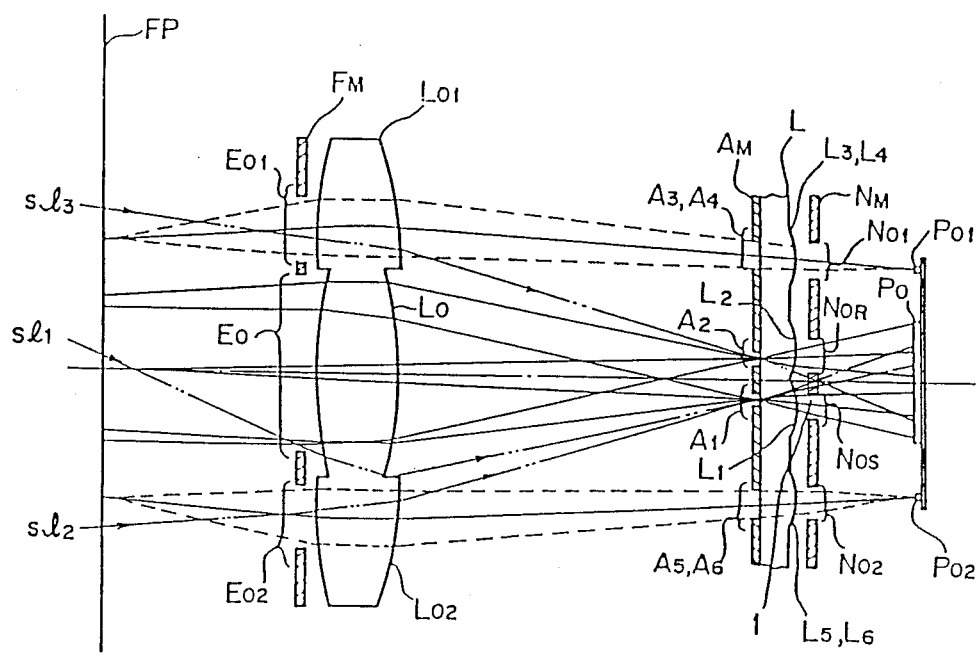
FIG. 2 and FIG. 3 are descriptive drawings of harmful light blocking in the embodiment as shown in FIG. 1.
Figure 3:
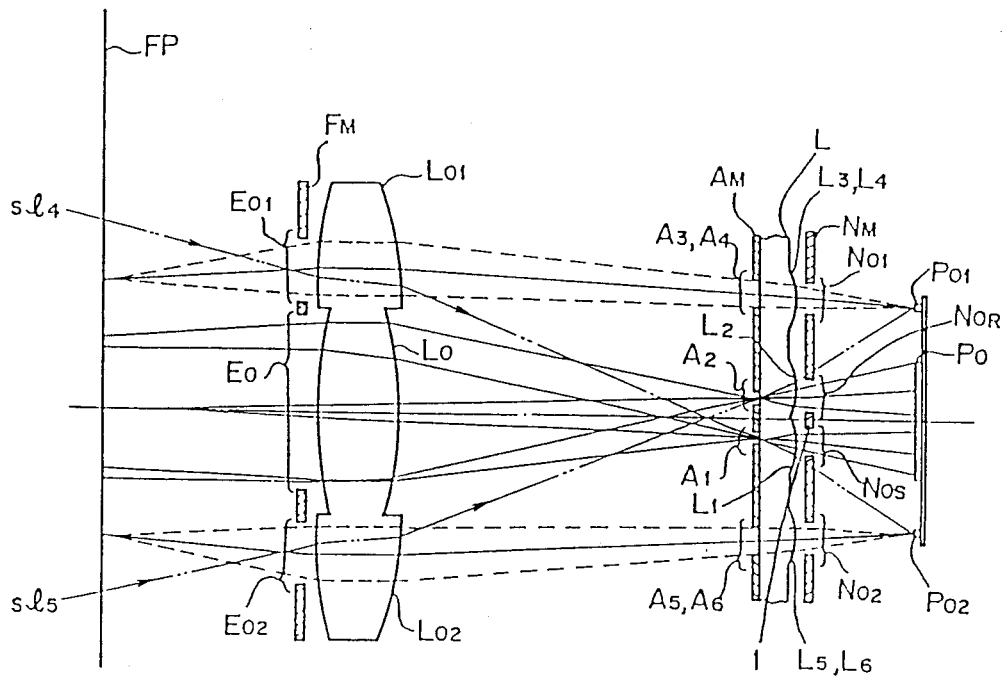

FIG. 2 and FIG. 3 are cross sections at line A-A in FIG. 1. FIG. 2 shows the situation by which harmful light is shielded from entering to CCD line sensor P0 for the axial focus detection area. Because a harmful ray sl1 which is incident to condenser lens L0 and reflected by a side surface, opposite to the optical axis, of condenser lens L02 passes aperture opening A1 in aperture mask AM and re-imaging lens L1, but is blocked by wall 1 between apertures N0S and N0R of shield member NM before the ray strikes CCD line sensor P0, the harmful ray does not reach CCD line sensor P0. Furthermore, because harmful rays sl3 and sl2 incident to condenser lenses L01 and L02 pass respective aperture openings A2 and A1 and re-imaging lenses L2 and L1, but are blocked by wall 1 between apertures N0S and N0R of shield member NM before the rays strike CCD line sensor P0, the harmful rays do not reach CCD line sensor P0.

FIG. 3 shows the situation by which harmful rays are shielded from entering to CCD line sensors P01 and P02 for the off-axial focus detection. Because harmful rays sl4 and sl5 incident to corresponding condenser lenses L01 and L02 pass corresponding aperture openings A1 and A2, and are blocked by shield member NM before the rays strike CCD line sensor P01, said harmful rays do not reach corresponding CCD line sensors P01 and P02.

Therefore, harmful light is prevented from entering CCD line sensors P0, P01 and P02, and high precision focus position detection can be obtained.

Figure 4:
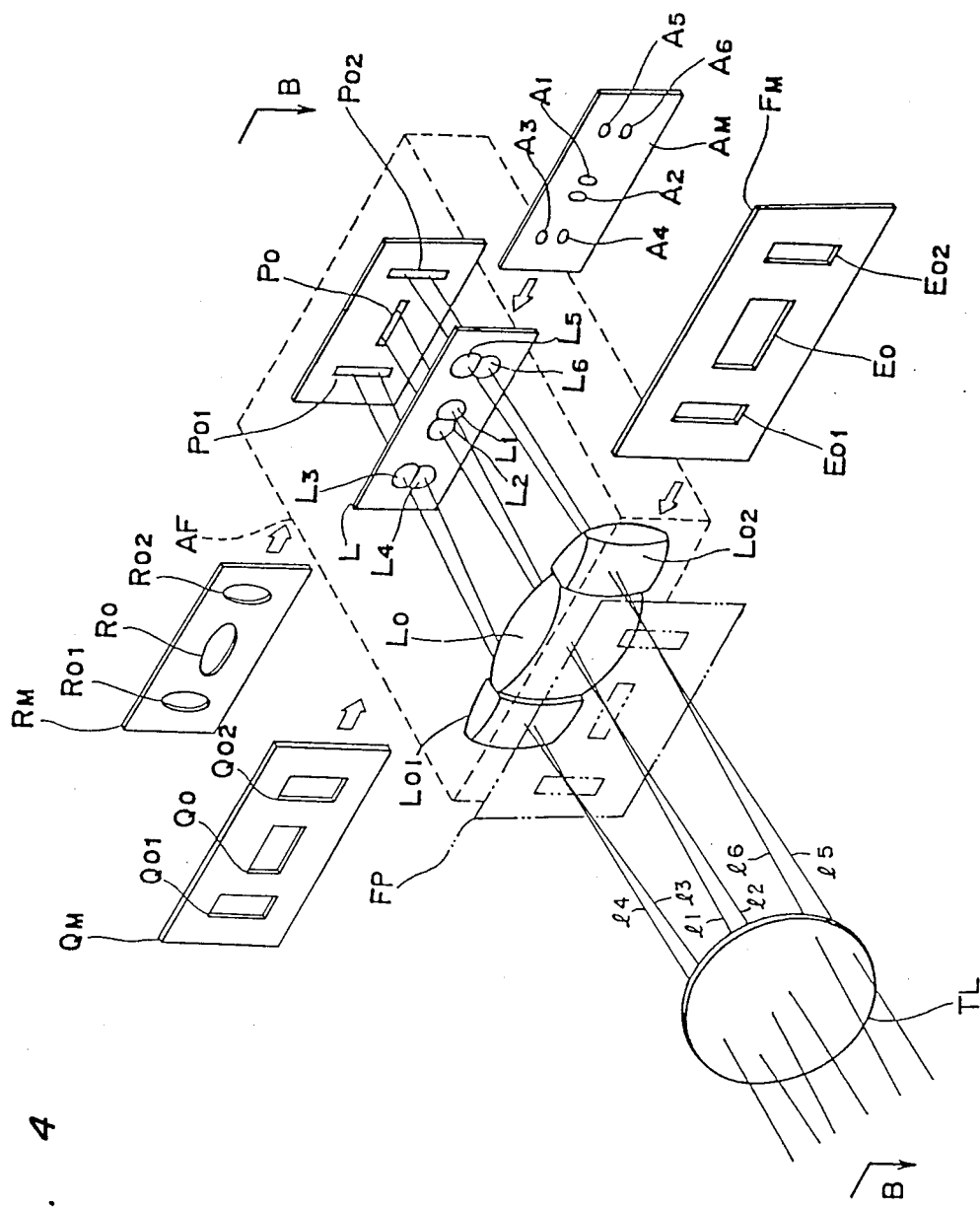
FIG. 4 is a perspective view showing the general construction of a second embodiment of the present invention.

FIG. 4 is a perspective view of the general construction of an alternative embodiment in which a light shield member is positioned after the position of shield member NM in FIGS. 2 and 3. RM is a first light shield member provided behind the position of light shield member NM shown in FIGS. 2 and 3; the shape of this first light shield member RM is the shape of light shield member NM shown in FIG. 1 from which wall 1 between apertures N0R and N0S is removed. QM is a second light shield member provided between condenser lenses L0, L01 and L02 and re-imaging lens plate L.

Figure 5:
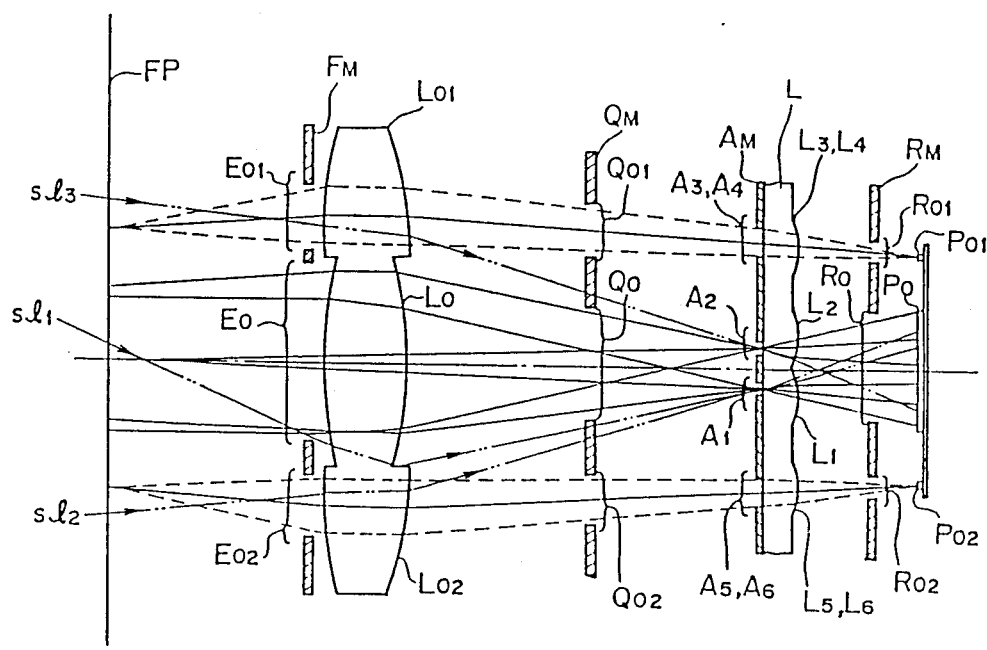
FIG. 5 and FIG. 6 are descriptive drawings of harmful light blocking in the embodiment as shown in FIG. 4.
Figure 6:
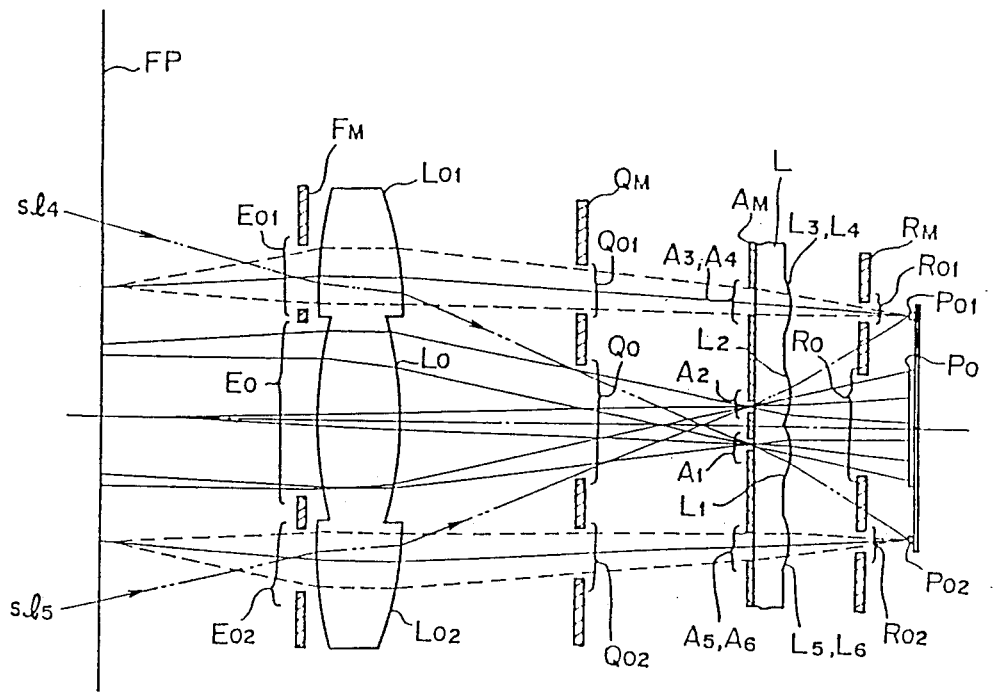

FIG. 5 and FIG. 6 are cross sections at line B-B in FIG. 4. FIG. 5 shows the situation by which harmful light is shielded from entering to CCD line sensor P0 for the axial focus detection. When it is attempted to block, at the position of first light shield member RM (immediately before CCD line sensor P0), harmful rays sl1 which is incident to condenser lens L0 and reflected by a side surface, opposite to the optical axis, of condenser lens L02, or harmful rays sl3 or sl2 which is incident to condenser lens L01 or L02, it is not possible to limit the light shield to these harmful rays sl1, sl2, and sl3 because the harmful rays sl1, sl2, and sl3 are mixed with the axial light flux on the CCD line sensor P0. Therefore, as previously described, aperture R0 in first light shield member RM was shaped similarly to the aperture in light shield member NM with wall 1 on the optical axis removed so that harmful rays sl1, sl2, and sl3 are not shielded by first light shield member RM, and second light shield QM was provided between condenser lenses L0, L01 and L02 and re-imaging lens plate L so that these harmful rays sl1, sl2, and sl3 are blocked by this second light shield QM.

FIG. 6 shows the situation by which harmful rays are shielded from entering to CCD line sensors P01 and P02 for off-axial focus detection. Because harmful rays sl4 and sl5 incident to corresponding condenser lenses L01 and L02 pass aperture Q0 in second light shield QM, aperture opening A2 and A1, and re-imaging lenses L2 and L1, respectively, and are blocked by first light shield member RM before the rays strike CCD line sensors P02 and P01, said harmful rays do not reach CCD line sensors P02 and P01. In other words, the harmful light which would be incident to CCD line sensors P01 and P02 are blocked by first light shield member RM, while the harmful light which would be incident to CCD line sensor P0 is blocked by second light shield QM, and consequently, high precision focus detection is obtained.

Figure 7:
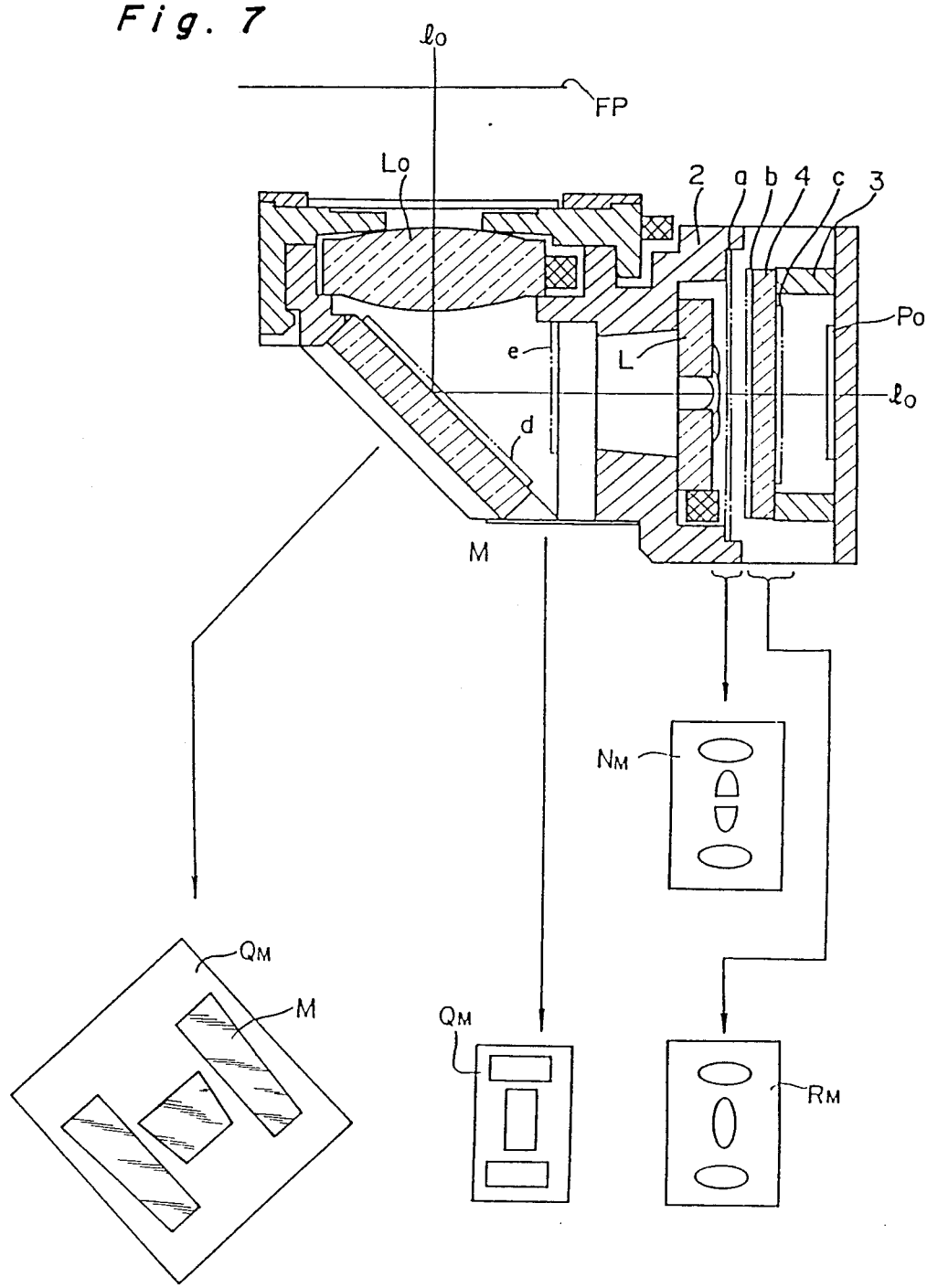
FIG. 7 is a cross section of the AF module.

FIG. 7 is a cross section of a sample installation of the AF sensor module shown in general construction diagrams FIG. 1 and FIG. 4. The direction of optical axis 10 in the AF module passing the objective lens TL is changed by mirror M in such a manner that optical axis 10 travels to CCD line sensor P0. Light shield member NM shown in FIG. 1 is provided immediately after re-imaging lens plate L at "a" (on a support member 2 provided for supporting the aforementioned re-imaging lens plate L), and harmful light is shielded by said light shield member NM. However, when first light shield member RM shown in FIG. 4 is provided at "b" or "c" (on a window glass 4 in package 3 which protects CCD line sensor P0) after position "a" of said light shield member NM, second light shield QM is provided on reflective surface "d" of mirror M or at "e" between said mirror M and re-imaging lens plate L, thus blocking harmful rays by means of first and second light shield members QM and RM.

Figure 8:
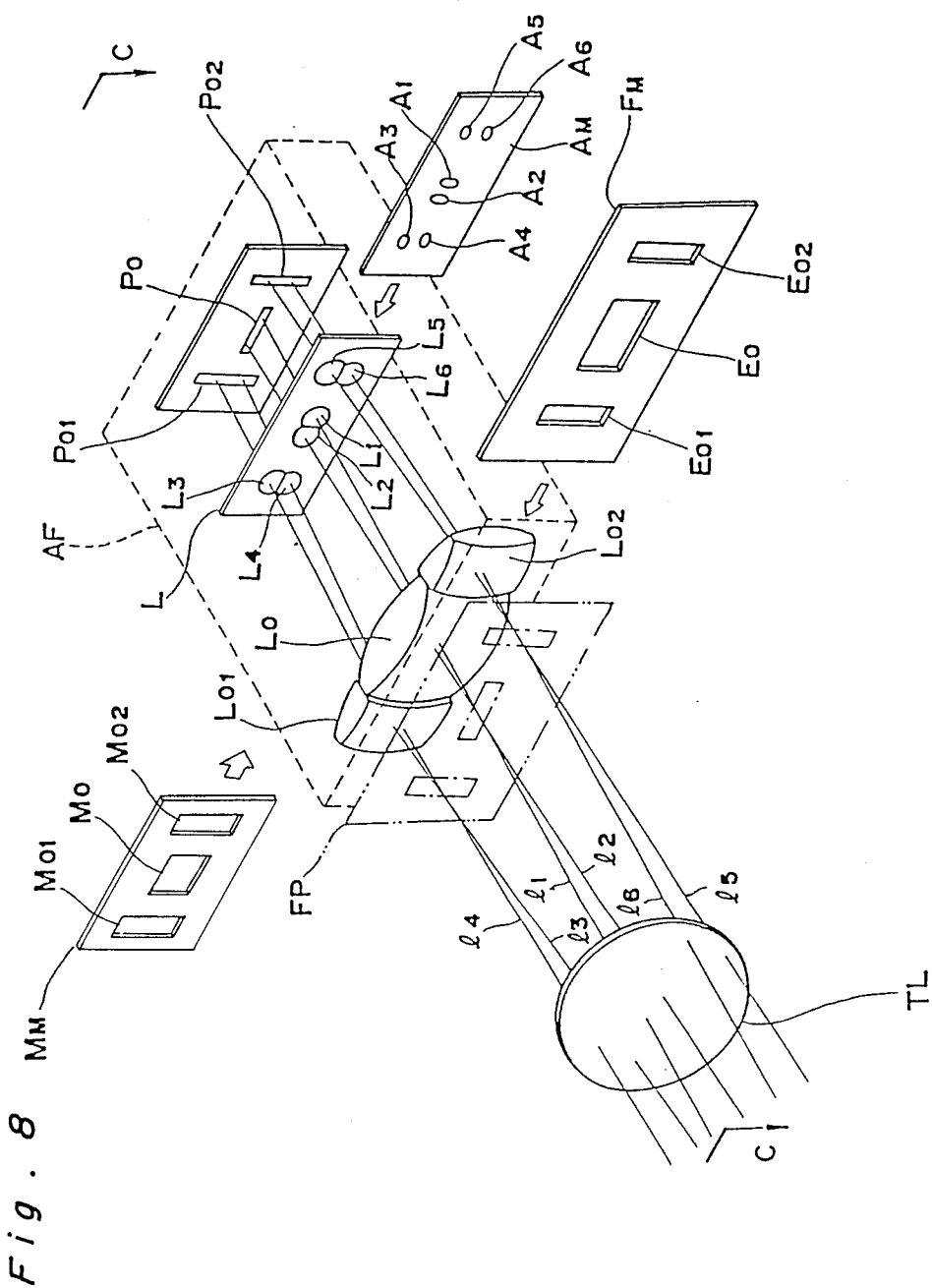
FIG. 8 is a perspective view showing the general construction of a third embodiment of the present invention.

FIG. 8 is a perspective view showing the general construction of an optical device for focus detection according to a third embodiment of the present invention. Those functional components which are the same in FIG. 8 as in FIG. 1 are given the same reference numbers, and further detailed description of such parts is here omitted.

This third embodiment of the present invention differs from the first embodiment shown in FIG. 1 in the following points, specifically whereas in FIG. 1 light shield member NM is provided between re-imaging lens plate L and CCD line sensors P0, P01 and P02 and immediately after re-imaging lens plate L, a light shield member NM is provided between re-imaging lens plate L and condenser lenses L0, L01 and L02 in the present embodiment, said light shield member MM being provided with a long horizontal rectangular aperture M0 at the center and with long vertical rectangular apertures M01 and M02 on both sides.

The focus detecting optical system of the above described construction works to detect the focus position in the following manner. The light flux for the off-axial focus detection area, that is, the off-axial light flux, containing the principal rays 13 and 14 travelling towards the field mask FM so as to pass away from the optical axis of the objective lens at a predetermined angle relative to the optical axis, passes through the respective rectangular opening E01 in the field mask FM, the respective condenser lens L01, and the aperture M01 in the shield member MM. The off-axial light flux having passed through the condenser lens L01 is deflected by the condenser lens L01 so as to travel towards the optical axis and then projected onto the associated CCD line sensor P01 through the paired apertures A3 and A4 in the aperture mask AM, and the paired image re-forming lens L3 and L4 in the image reforming lens plate L. In this way, paired images are re-formed on the CCD line sensors P01. On the other hand, the other light flux for the other off-axial focus detection area, that is, the other off-axial light flux, containing the principal rays l5 and l6 travelling towards the field mask FM so as to pass away from the optical axis at the predetermined angle relative to the optical axis, passes through the respective rectangular opening E02 in the field mask FM through the respective condenser lens L02, and then through the aperture M02 in the shield member MM, and are subsequently similarly projected onto the associated CCD line sensor P02 through the paired apertures A5 and A6 in the aperture mask AM, and the paired image re-forming lens L5 and L6 in the image re-forming lens plate L. In this way, paired image are reformed on the CCD line sensors P02.

The light flux for the axial focus detection area, that is, the axial light flux, containing principal rays l1 and l2 is, after having passed through the rectangular opening E0, the condenser lens L0, aperture M0 in the shield member MM, the paired apertures A1 and A2, the paired image re-forming lenses L1 and L2, all aligned with the optical axis, converged on and projected onto the CCD line sensor P0, thereby to form the paired image thereon. By determining the positions of the paired images projected on the CCD line sensors P0, P01 and P02, the focusing condition of the objective lens TL can be detected. At such time, harmful light which may be incident on CCD line sensors P0, P01 and P02 through some passage other than the passages shown for light rays l1, l2, l3, l4, l5, and l6 in FIG. 1 is blocked by the aforementioned shield member MM.

Figure 9:
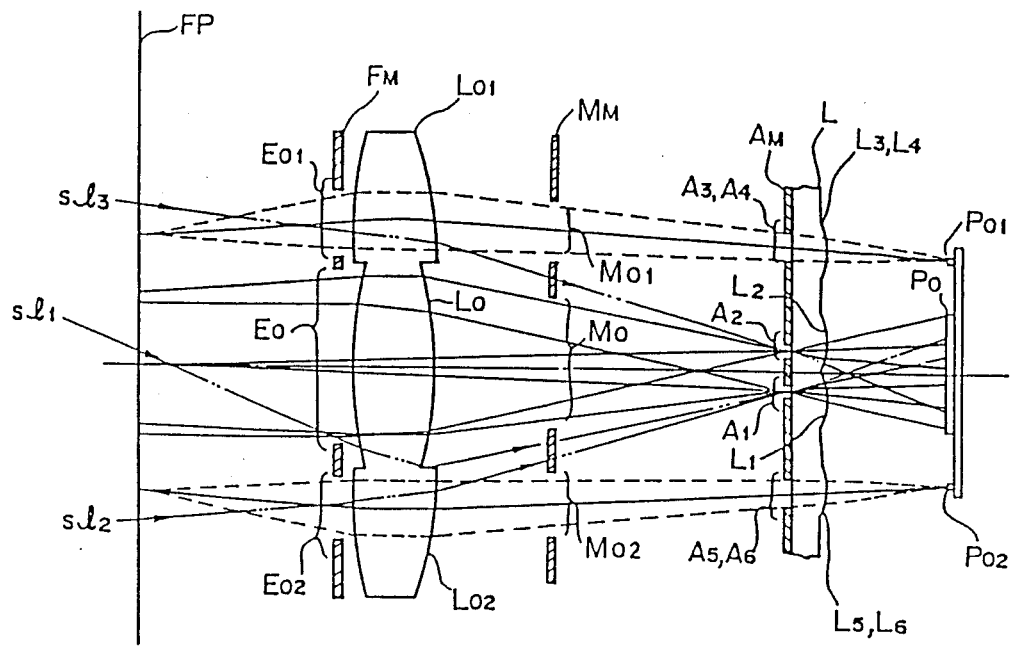
FIG. 9 and FIG. 10 are descriptive drawings of harmful light blocking in the embodiment as shown in FIG. 8.
Figure 10:
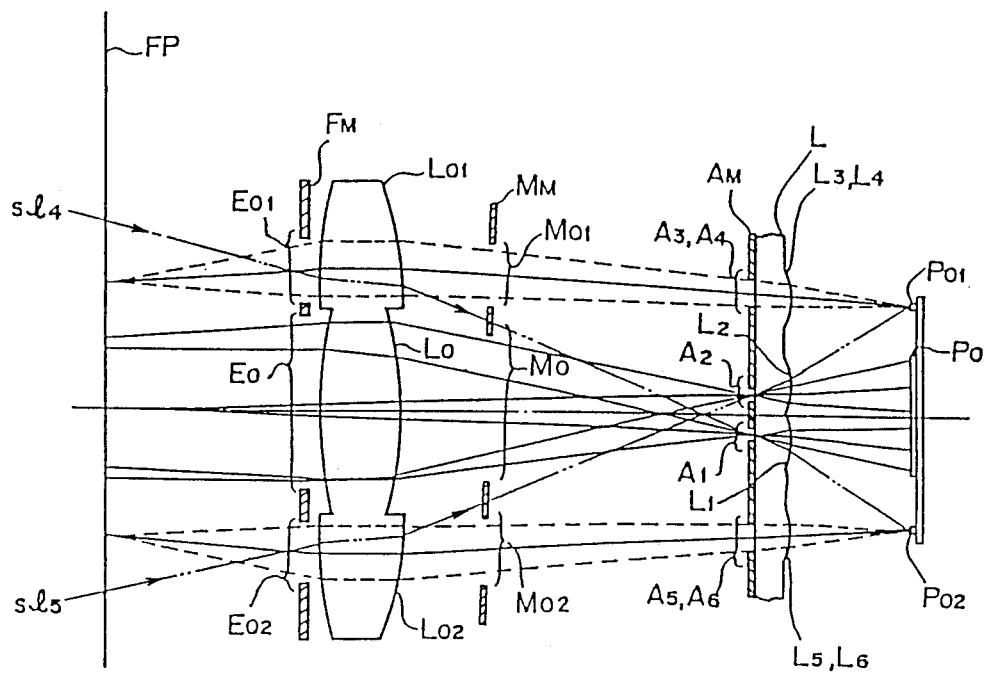

FIG. 9 and FIG. 10 are cross sections at line C-C in FIG. 8. FIG. 9 shows the situation by which harmful rays are shielded from entering to CCD line sensor P0 for the axial focus detection. Because harmful rays sl1 which is incident to condensor lens L0 and reflected by a side surface, opposite to the optical axis, of condenser lens L02 is blocked by light shield MM before reaching aperture opening A1 in aperture mask AM, said harmful ray does not reach CCD line sensor P0. Furthermore, because harmful rays sl3 and sl2 incident to condenser lenses L01 and L02 pass condenser lenses L01 and L02, but are blocked by light shield member MM before reaching apertures A1 and A2, said harmful rays do not reach CCD line sensor P0.

FIG. 10 shows the situation by which harmful rays are shielded from entering to CCD line sensors P01 and P02 for the off-axial focus detection. Because harmful rays sl4 and sl5 incident to corresponding condenser lenses L01 and L02 pass condenser lenses L01 and L02, but are blocked by light shield member MM before reaching apertures A1 and A2, said harmful rays do not reach CCD line sensors P02 and P01.

Therefore, harmful light is prevented from entering CCD line sensors P0, P01 and P02, and high precision focus position detection can be obtained.

Figure 11:
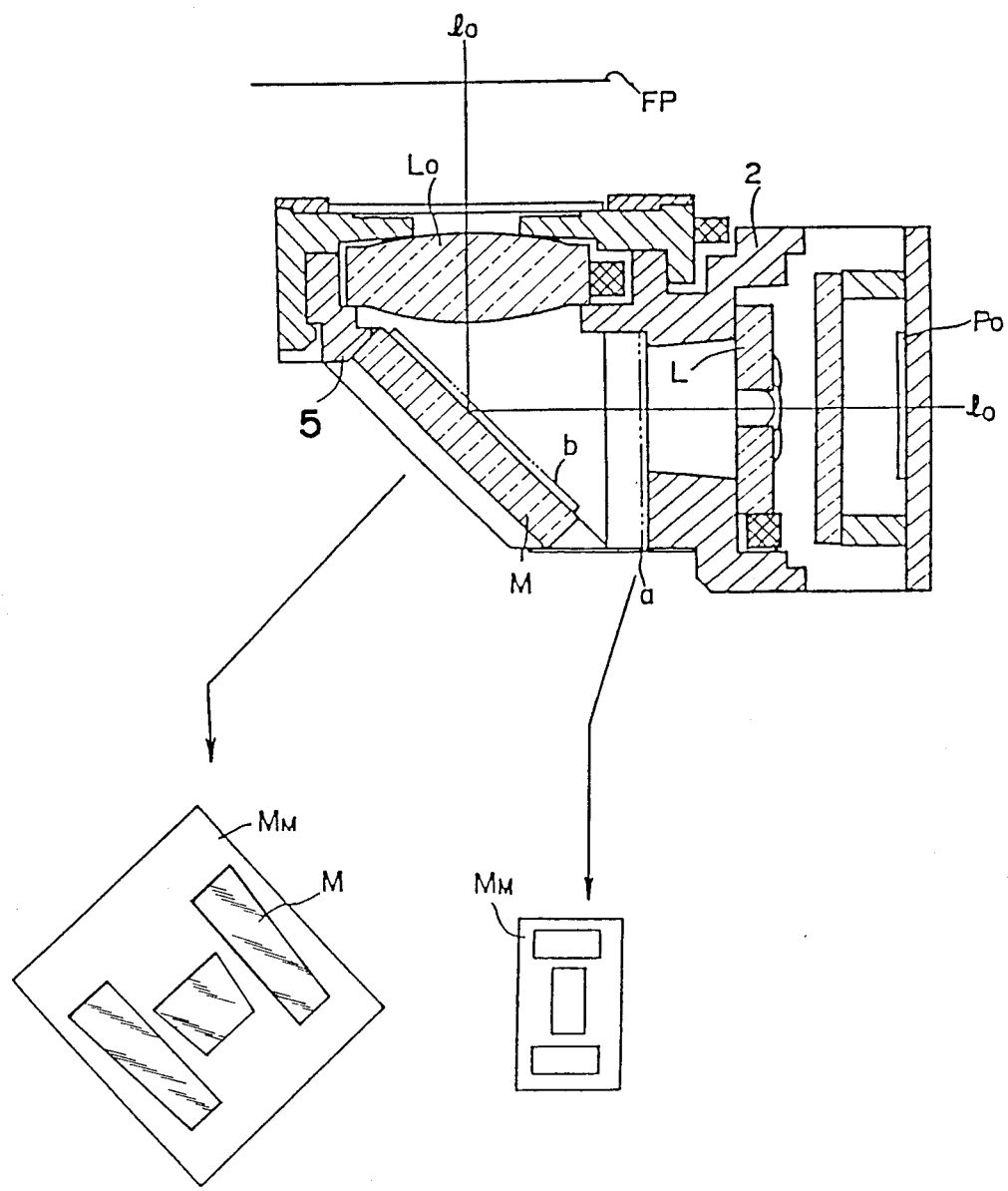
FIG. 11 is a cross section of the AF module.
Figure 12:
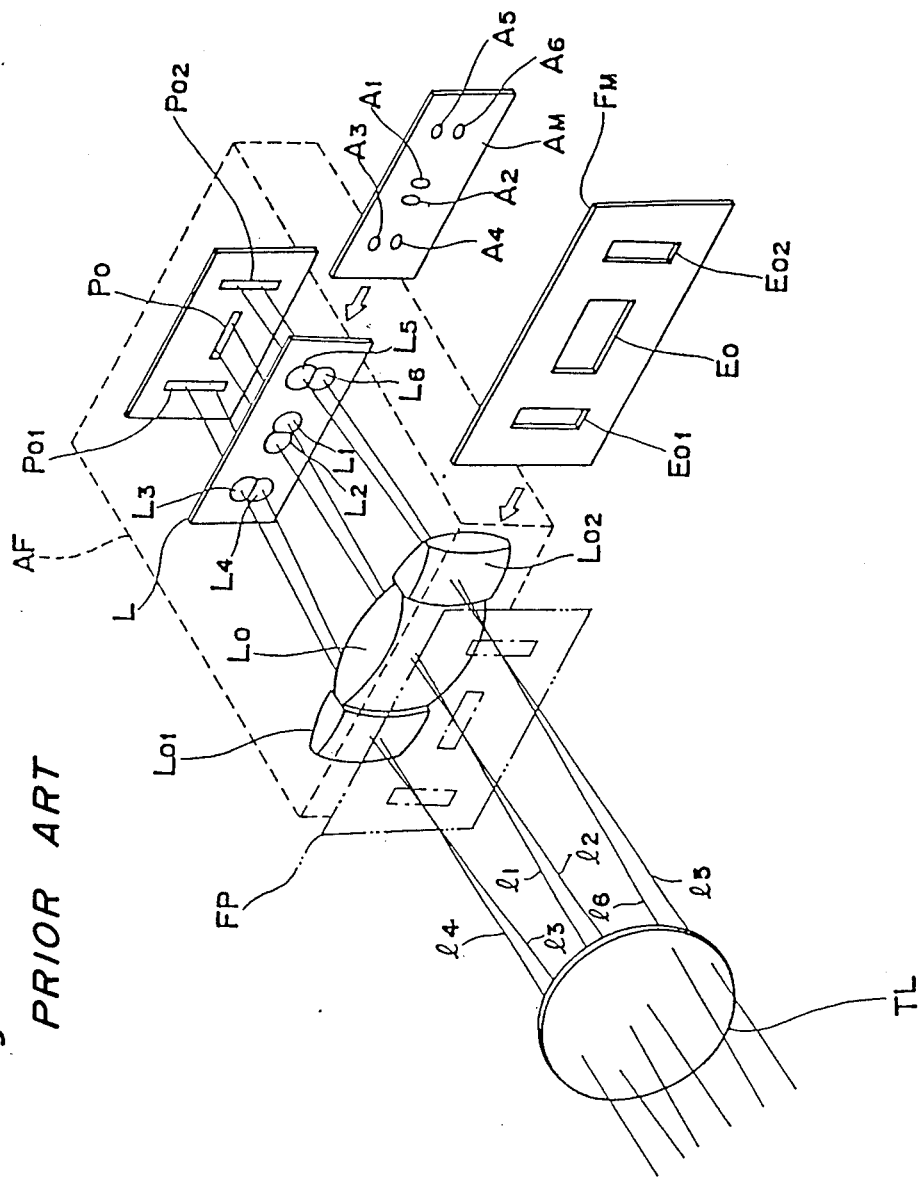
FIG. 12 is a perspective view of a conventional detecting device.

FIG. 11 is a cross section of a sample installation of the AF sensor module shown in general construction diagram FIG. 8. The direction of optical axis 10 in the AF module AF passing the objective lens TL is changed by mirror M, which is an optical deflection member, in such a manner that optical axis 10 travels to CCD line sensor P0. Said light shield member MM is provided between condenser lens L0 and re-imaging lens panel L at position "a" (at supports 2 of said re-imaging lens panel L) in such a manner that stray light is blocked by this light shield member MM.

In the present embodiment, light shield member MM is provided at supports 2 of re-imaging lens panel L, but alternatively, light shield member MM may be provided on a reflective surface of said mirror M (position "b" in FIG. 11) provided between condenser lens L0 and re-imaging lens plate L, components may be common, and may be incorporated to the AF sensor module to simplify the construction. Regarding methods of providing light shield member MM on mirror M, a method in which light shield member MM may be placed in contact with the surface of mirror M and secured to support 5, a method in which the reflectivity of the area blocking the harmful light on the surface of mirror M is reduced (for example, the surface made black, or made rough), or other methods may be employed.

As will be clear from the above description, an optical device for focus detection according to the present invention can prevent the incidence of harmful light from areas outside the light rays which are used for focus detection and correspond to the light receiving element arrays, to the aforementioned arrays because a light shield member to prevent the incidence of harmful light to the arrays is provided between the condenser lens and re-imaging lenses or between the re-imaging lenses and the sensors, the resulting AF module can be made compact, and, moreover, high focus detection precision can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A focus detecting device, comprising:
an objective lens for forming an image of an object;
a plurality of focus detecting blocks each of which includes; a condenser lens located nearby a predetermined focal plane of the objective lens; a pair of image re-forming lenses, located behind the condenser lens, for re-forming a pair of secondary images of the image formed by the objective lens; a mask plate, located nearby the pair of image re-forming lenses, having a pair of aperture openings through which a light bundle forming the secondary images passes; a light receiving means for receiving the pair of the secondary images formed by the pair of image re-forming lenses to produce a light intensity distribution signal representing the light intensity distribution of the secondary images; and a light interrupting means, located between the condenser lens and the light receiving means, for prohibiting the harmful light from being incident on the light receiving means; and
a focus condition calculating means for calculating a focus condition of the objective lens in accordance with the light intensity distribution signals produced by the plurality of focus detecting blocks.

2. A focus detecting device as claimed in claim 1, wherein a light interrupting means provided in a specified focus detecting block operates to interrupt the harmful light which is incident on a light receiving means in the other focus detecting block.

3. A focus detecting device as claimed in claim 2, wherein the light interrupting means operates to prohibit the harmful light which passed through a condenser lens in a specified focus detecting block from being incident on a pair of image re-forming lenses in the other focus detecting block.

4. A focus detecting device as claimed in claim 1, wherein a light interrupting means is located at a position between the condenser lens and the pair of image reforming lenses, in the respective focus detecting block.

5. A focus detecting device as claimed in claim 4, further comprising supporting means for supporting the pair of image re-forming lenses at a predetermined position, and wherein the light interrupting means is also supported by the supporting means, in the respective focus detecting block.

6. A focus detecting device as claimed in claim 4, further comprising a light direction changing means, located nearby the condenser lens, for changing the direction along which a light bundle forming the secondary images passes, and wherein the light interrupting means is formed integrally with the light direction changing means, in the respective focus detecting block.

7. A focus detecting device as claimed in claim 6, wherein the interrupting means is provided on the object side surface of the light direction changing means.

8. A focus detecting device as claimed in claim 6, wherein the light direction changing means includes a light reflecting member for reflecting the incident light and the interrupting means is provided on the surface of the light reflecting member.

9. A focus detecting device as claimed in claim 1, wherein a light interrupting means includes a first light interrupting member located at a position between the pair of image re-forming lenses and the light receiving means, in the respective focus detecting block.

10. A focus detecting device as claimed in claim 9, further comprising a protecting member for protecting the light receiving means with having a window through which the light bundle forming the secondary images passes, and wherein the first light interrupting member is provided on the window.

11. A focused detecting device as claimed in claim 9, further comprising supporting means for supporting the pair of image re-forming lenses at a predetermined position, and wherein the first light interrupting member is also supported by the supporting means, in the respective focus detecting block.

12. A focus detecting device as claimed in claim 9, wherein a light interrupting means further includes a second light interrupting member located at a position between the condenser lens and the pair of image re-forming lenses, in the respective focus detecting block.

13. A focus detecting device as claimed in claim 9, wherein the first light interrupting member is provided for prohibiting the harmful light which passed through a pair of image re-forming lenses in a specified focus detecting block from being incident on a light receiving means in the other focus detecting block.

14. A focus detecting device, comprising;
an objective lens for forming an image of an object;
a plurality of focus detecting blocks each of which includes; a condenser lens located nearby a predetermined focal plane of the objective lens; a pair of image re-forming lenses, located behind the condenser lens, for re-forming a pair of secondary images of the image formed by the objective lens; a mask plate, located nearby the pair of image reforming lenses, having a pair of aperture openings through which a light bundle forming the secondary images passes; a light receiving means for receiving the pair of the secondary images formed by the pair of image re-forming lenses to produce a light intensity distribution signal representing the light intensity distribution of the secondary images;

a light interrupting means for prohibiting the harmful light from being incident on the light receiving means; and a focus condition calculating means for calculating a focus condition of the objective lens in accordance with the light intensity distribution signals produced by the plurality of focus detecting blocks.

15. A focus detecting device as claimed in claim 14, wherein the plurality of focus detecting blocks include an on-axial focus detecting block provided for forming the pair of the secondary images of the image formed on the optical axis of the objective lens with respect to the image plane of the objective lens, and a plurality of off-axial focus detecting blocks provided for forming the pair of the secondary images of the image formed on the off-axial regions of the objective lens with respect to the image plane of the objective lens.

16. A focus detecting device as claimed in claim 14, wherein the light interrupting means is located at a position between the condenser lens and the pair of image re-forming lenses, in the respective focus detecting blocks.

17. A focus detecting device as claimed in claim 14, wherein the light interrupting means is located at a position between the pair of image re-forming lenses and the light receiving means, in the respective focus detecting blocks.

* * * * *